(12) United States Patent
Kuno

(10) Patent No.: US 8,243,091 B2
(45) Date of Patent: Aug. 14, 2012

(54) IMAGE PROCESSOR CAPABLE OF CONVERTING VALUES IN A COLOR GAMUT FOR SUITABLE COLOR MATCHING

(75) Inventor: Masashi Kuno, Obu (JP)

(73) Assignee: Brother Kogyo Kabushiki Kaisha, Aichi-Ken (JP)

(*) Notice: Subject to any disclaimer, the term of this patent is extended or adjusted under 35 U.S.C. 154(b) by 662 days.

(21) Appl. No.: 12/164,778

(22) Filed: Jun. 30, 2008

(65) Prior Publication Data
US 2009/0002390 A1    Jan. 1, 2009

(30) Foreign Application Priority Data
Jun. 29, 2007    (JP) .................... 2007-173155

(51) Int. Cl.
*G09G 5/02*    (2006.01)
(52) U.S. Cl. ......... 345/590; 345/589; 345/591; 345/593
(58) Field of Classification Search .......... 345/589, 345/590
See application file for complete search history.

(56) References Cited

U.S. PATENT DOCUMENTS

| | | | |
|---|---|---|---|
| 6,297,826 B1 | 10/2001 | Semba et al. | |
| 6,411,304 B1 * | 6/2002 | Semba et al. | 345/590 |
| 2006/0274340 A1 * | 12/2006 | Yamazoe | 358/1.9 |

FOREIGN PATENT DOCUMENTS

| | | |
|---|---|---|
| JP | 10-243246 | 9/1998 |
| JP | 11-313219 | 11/1999 |
| JP | 2001-14448 | 1/2001 |
| JP | 2003-323609 | 11/2003 |

* cited by examiner

*Primary Examiner* — Kee M Tung
*Assistant Examiner* — Zhengxi Liu
(74) *Attorney, Agent, or Firm* — Scully, Scott, Murphy & Presser, P.C.

(57) ABSTRACT

An image processor includes a first data acquiring unit, a second data acquiring unit, a third data acquiring unit, a convergence point setting unit, and a converting unit. The first data acquiring unit acquires first color data that is included in a first color gamut. The second data acquiring unit acquires second color data having a highest chroma of a second color gamut. The second color gamut has a middle point on an achromatic axis. The third data acquiring unit acquires third color data that is located on the achromatic axis and that is closer to the middle point than a point on the achromatic axis having the same lightness of the second color data. The convergence point setting unit sets a convergence point for the first color data on a first line segment defined between the second color data and the third color data. The converting unit converts the first data into fourth data that is included in the second color gamut by moving the first data in a direction toward the convergence point.

8 Claims, 5 Drawing Sheets

(PROCESS IN PRINTER)

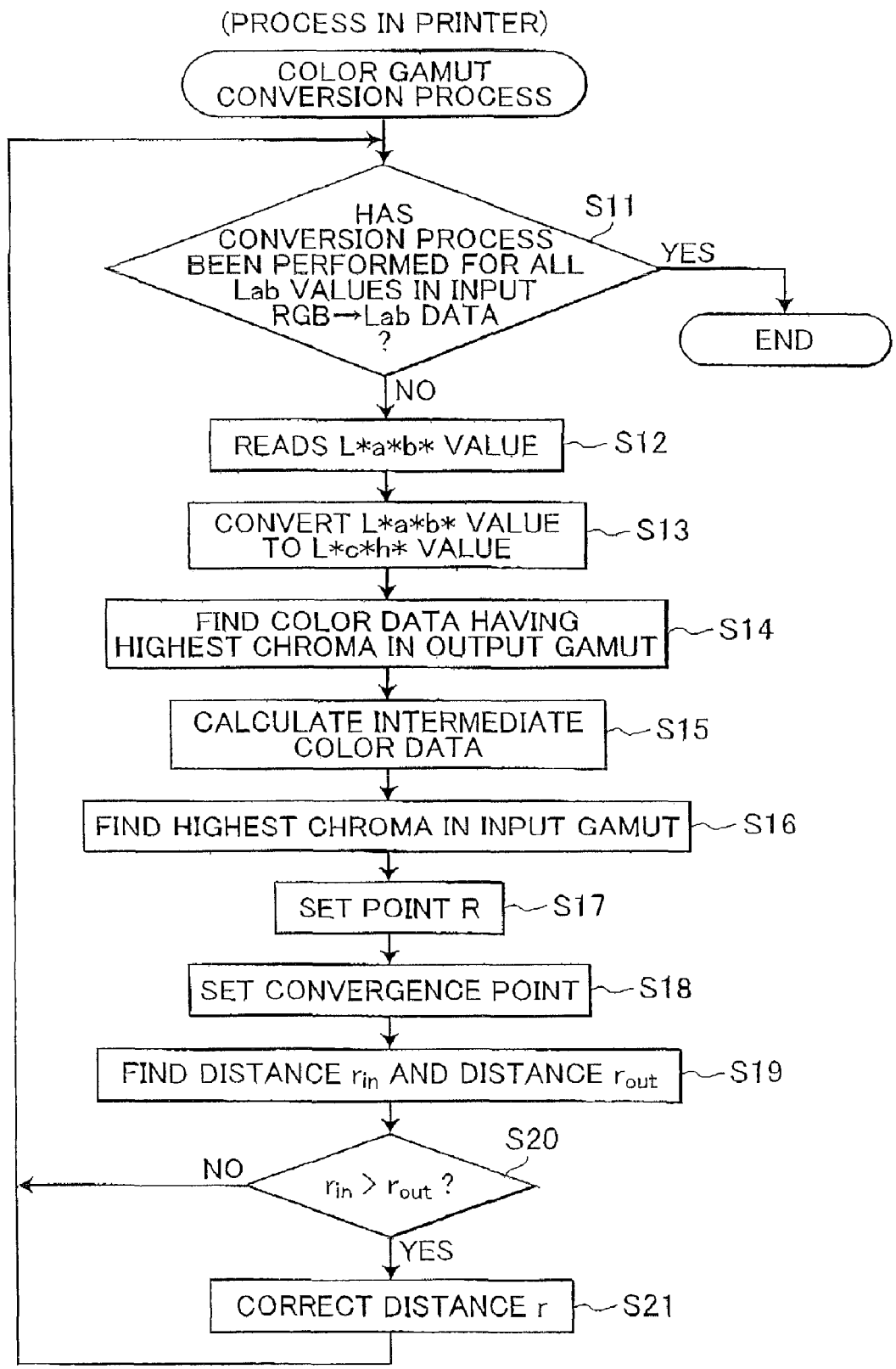

IMAGE PROCESSOR CAPABLE OF CONVERTING VALUES IN A COLOR GAMUT FOR SUITABLE COLOR MATCHING

CROSS REFERENCE TO RELATED APPLICATION

This application claims priority from Japanese Patent Application No. 2007-173155 filed Jun. 29, 2007. The entire content of this priority application is incorporated herein by reference.

TECHNICAL FIELD

The present invention relates to an image processor, particularly to an image processor capable of converting values in a color gamut for suitable color matching.

BACKGROUND

Liquid crystal displays and color printers are known as devices for rendering color images. Color matching is a process for generating substantially equivalent colors in images displayed on a liquid crystal display and images printed on a color printer or for generating substantially equivalent colors in color images printed on one color printer and color images printed on another color printer.

That is, a color image produced on one color image device is rendered in different colors from those in the same color image produced on a different color image device due to discrepancies in characteristics of the two color image devices. For example, when two different color image devices have color gamuts of different sizes, there will exist colors that can be displayed on one device but not on the other.

When matching colors in images displayed on a device with a small color gamut to images displayed on a device with a large color gamut, the large color gamut must be compressed and colors must be rendered on the color image device having the small color gamut based on the compressed gamut.

SUMMARY

Various methods of compressing color gamuts have been proposed over the years. These methods will be described here with reference to FIGS. 1(a)-1(c). FIGS. 1(a), 1(b), and 1(c) illustrate the concept of a conventional color data conversion method for converting color data included in a first color gamut (hereinafter referred to as the "input gamut") to color data included in a second color gamut (hereinafter referred to as the "output gamut"), both being in the L*a*b* color space. For simplicity, each graph in FIGS. 1(a)-1(c) depicts a plane at a prescribed hue h* in the color space, where the horizontal axis represents chroma c* and the vertical axis represents lightness L*. The input gamut is depicted with a one-dot-and-one-chain line and the output gamut with a solid line.

FIG. 1(a) illustrates a first method of color conversion. In this method, color data in the input gamut is converted to fit in the output gamut by setting achromatic color data having the same lightness as a point of convergence. The color data in the input gamut is converted to the direction of this convergence point. In the example shown in FIG. 1(a), input color data A is converted to output color data A' having the same lightness as the input color data A by setting the convergence point to a point P1 on the achromatic axis. Input color data B is similarly converted to output color data B'. This method of conversion is problematic because the chroma value is greatly modified.

In addition, input color data C is converted to output color data C' at a point on the achromatic axis having the same lightness as the input color data, while input color data D is similarly converted to achromatic output color data D'. However, the converted output color data C' and D' lies outside the output gamut.

FIG. 1(b) illustrates a second method of color conversion. When converting color data from an input gamut to data included in an output gamut, a point of convergence is set to a point P3 that is achromatic color data having a value of lightness halfway between maximum and minimum values for lightness in the output gamut, and the input color data is converted toward the point of convergence.

In the example of the second method shown in FIG. 1(b), input color data A, B, C, and D is converted to output color data A', B', C', and D', respectively. The output color data A', B', C', and D' is positioned on the periphery of the output gamut. Hence, unlike the first method, the second method eliminates colors in the output color data that cannot be printed with a printer or the like by ensuring that the converted output color data falls within the output gamut.

The second method also reduces the drop in chroma from that in the first method when converting input color data D having high lightness to output color data D', or when converting input color data C having low lightness to output color data C'.

However, the second method is problematic in that there is considerable change in lightness for input color data B, C, and D. Further, while the change in chroma is reduced from that in the first method, the change remains significant.

FIG. 1(c) illustrates a third method of conversion disclosed in Japanese patent application publication No. 2001-14448 In this third method, convergence points are set on the achromatic axis or on a line connecting color data M having the highest chroma among colors in the output gamut and achromatic color data N located on the achromatic axis. The position of each convergence point is set based on the lightness and chrome of the color data. As shown in the example of FIG. 1(c), input color data A, B, C, and D is converted to output color data A', B', C', and D' by setting a point P4 on the line MN as the convergence point for the input color data D and points P5, P6, and P7 on the achromatic axis as convergence points for the input color data A, B, and C.

However, converting input color data D as shown in FIG. 1(c) according to the method disclosed in Japanese patent application publication No. 2001-14448 is problematic because the changes in colors are not smooth. This is because the convergence point set to the point P4 on the segment MN and the distance between the convergence point and the input color data is too short. In other words, color changes are not smooth in some cases because the color gamut is compressed more as the ratio of the distance between the convergence point and the surface of the input gamut and the distance between the convergence point and the surface of the output gamut is greater.

In view of the foregoing, it is an object of the present invention to provide an image processor capable of suitably converting input color data within a first color gamut to output color data in a second color gamut.

In order to attain the above and other objects, the invention provides an image processor converting color data. The image processor includes a first data acquiring unit, a second data acquiring unit, a third data acquiring unit, a convergence point setting unit, and a converting unit. The first data acquiring unit acquires first color data that is included in a first color gamut. The second data acquiring unit acquires second color data having a highest chroma of a second color gamut. The second color gamut has a middle point on an achromatic axis between a highest lightness of the second color gamut on the achromatic axis and a lowest lightness of the second color gamut on the achromatic axis. The third data acquiring unit acquires third color data that is located on the achromatic axis and that is closer to the middle point than a point on the achromatic axis having the same lightness of the second color data. The convergence point setting unit sets a convergence point for the first color data on a first line segment defined between the second color data and the third color data. The converting unit converts the first data into fourth data that is included in the second color gamut by moving the first data in a direction toward the convergence point.

BRIEF DESCRIPTION OF THE DRAWINGS

Embodiments in accordance with the invention will be described in detail with reference to the following figures wherein:

FIG. 5 is a flowchart illustrating steps in a color gamut conversion process performed during the image process.

DETAILED DESCRIPTION

Figure 1A:
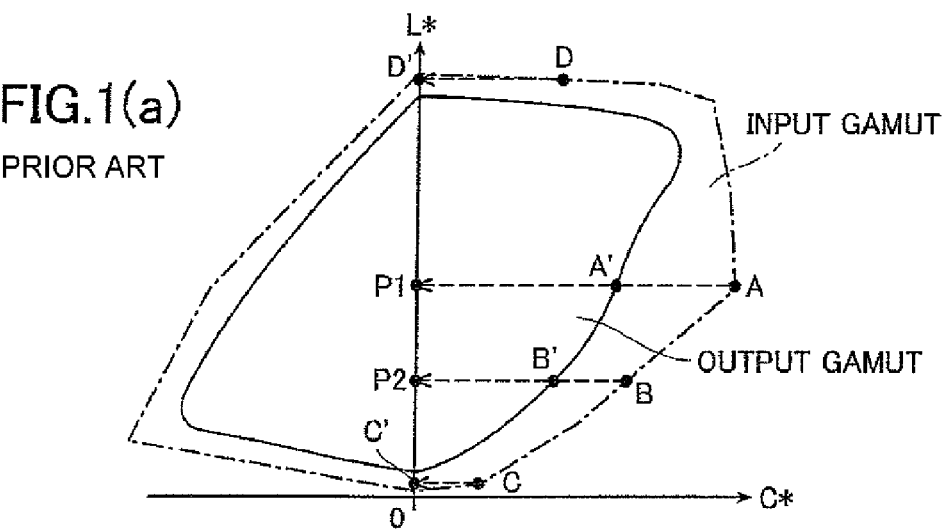
FIG. 1(a) illustrates a first method of color conversion.
Figure 1B:
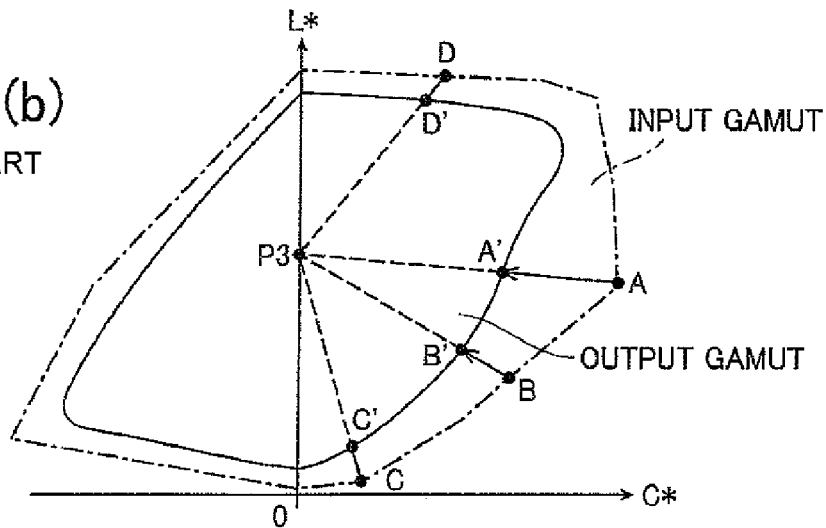
FIG. 1(b) illustrates a second method of color conversion.
Figure 1C:
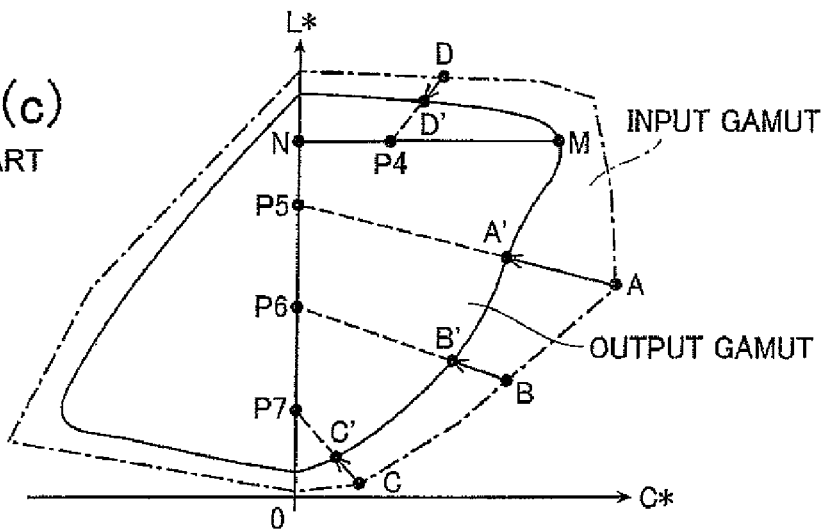
FIG. 1(c) illustrates a third method of color conversion.
Figure 2:
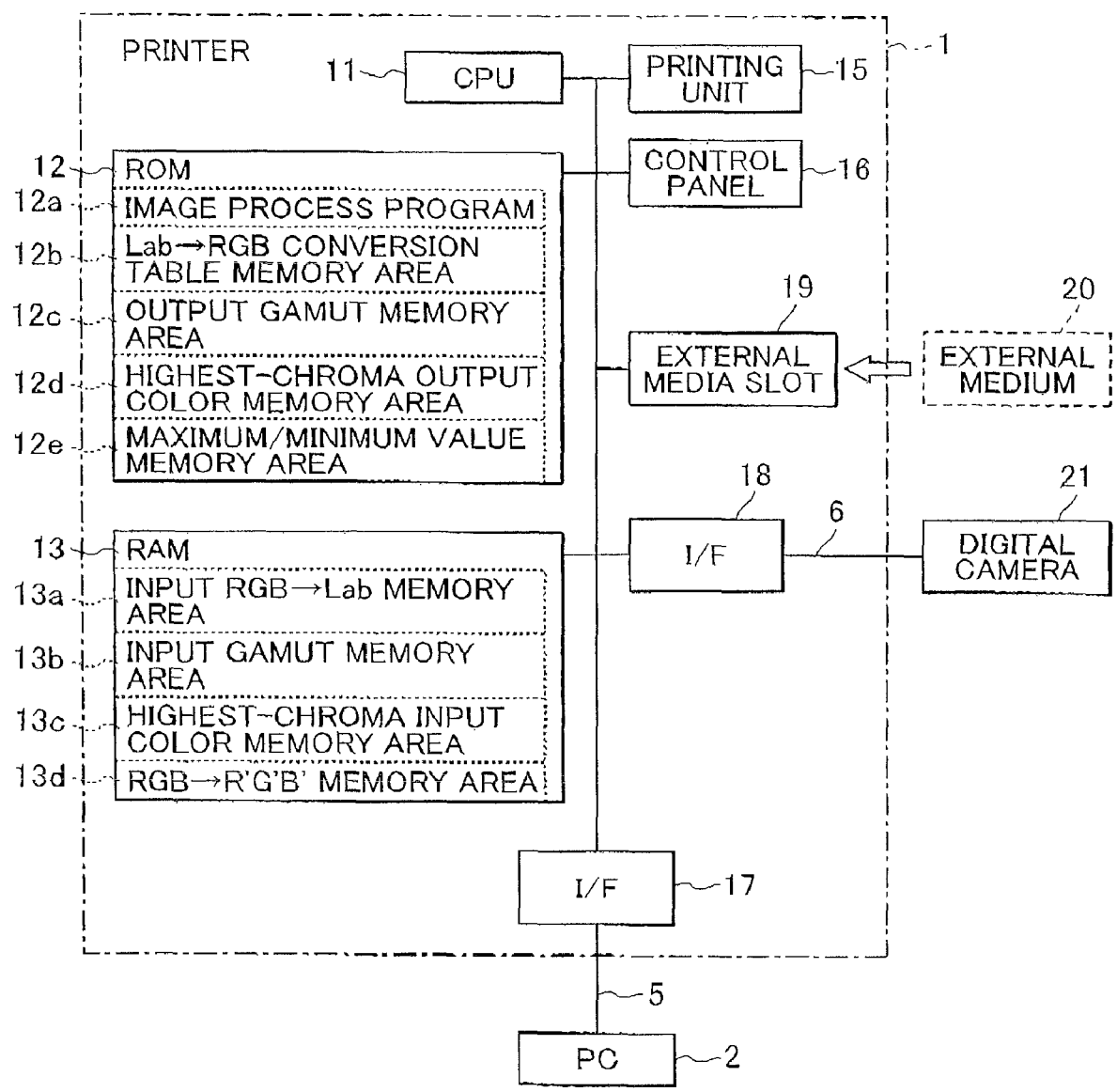
FIG. 2 is a block diagram showing the electrical structure of a printer according to an embodiment.

Next, an embodiment of the invention will be described while referring to the accompanying drawings. FIG. 2 is a block diagram showing the electrical structure of a printer 1 serving as the embodiment of the image processor according to the invention. As shown in FIG. 2, the printer 1 is capable of receiving image data inputted from a personal computer (hereinafter abbreviated to "PC") 2, a digital camera 21, or an external medium 20, and printing this image data on prescribed printing media.

The printer 1 includes a CPU 11, a ROM 12, a RAM 13, a printing unit 15 configured of a print head for printing images on the printing media (paper, for example), and a control panel 16 having a user operating section through which the user can input operations for specifying various data to be inputted, and for selecting printing media.

The printer 1 also includes an interface 17 with which the printer 1 can be connected to the PC 2 via a cable 5, an interface 18 with which the printer 1 can be connected to the digital camera 21 via a cable 6, and an external media slot 19 in which the external medium 20 (a medium configured of flash memory, such as an SD Card or a Memory Stick, for example) can be detachably mounted. In recent years, these interfaces 17 and 18 perform communications according to the Universal Serial Bus (USB) standard.

Image data stored on the external medium 20 can be inputted into the printer 1 via the cable 5 and the interface 17.

Image data captured by the digital camera 21 can be inputted into the printer 1 via the cable 6 and the interface 18. Image data stored in the external medium 20 mounted in the external media slot 19 can be inputted into the printer 1 via the external media slot 19.

The printer 1 also has a function for converting color data to match color image printed on the printer 1 with color images printed on another printer A. To implement this function, the PC 2 or external medium 20 inputs color data for color samples printed on the other printer A (hereinafter referred to as "input RGB→Lab data") into the printer 1. The printer 1 determines a color gamut of the printer A targeted for color matching based on the input RGB→Lab data and performs color conversion based on the determined color gamut.

The input RGB→Lab data includes a plurality of sets of L*a*b* values in one to one correspondence with a plurality sets of RGB values that are inputted to the target printer A. The input RGB→Lab data is created in a manner described below. Color samples are formed using printer A based on various combinations of RGB values. For example, each of the RGB values is represented by 8 bits, i.e., a decimal number from 0 to 255. Color samples are formed based on these sets of RGB values, wherein each of the R, G, and B values is varied in 9 steps in the order 0, 16, 32, . . . for a total of 9×9×9=729 RGB values. L*a*b* values are subsequently found using a calorimeter to measure each of the color samples.

The CPU 11 is an arithmetic processor for controlling overall operations of the printer 1. The ROM 12 stores various control programs executed by the CPU 11, and fixed values referenced by the CPU 11 when executing the programs. The ROM 12 also stores an image process program 12a as a control program and further includes a Lab→RGB conversion table memory area 12b, an output gamut memory area 12c, a highest-chroma output color memory area 12d, and a maximum/minimum value memory area 12e.

The image process program 12a is for implementing an image process described later with reference to the flowcharts in FIGS. 4 and 5, and a process for finding a color gamut for the printer A based on the input RGB→Lab data.

The output gamut memory area 12c stores a color gamut of the printer 1 (output gamut) with respect to a prescribed recording medium. Data indicating the color gamut specifies the surface of a solid encompassing L*a*b* values. The L*a*b* values are sample points defined by output RGB→Lab data for the printer 1. The output RGB→Lab data includes a plurality of sets of L*a*b* values in one to one correspondence with a plurality of sets of RGB values. The output RGB→Lab data is determined by inputting the plurality of sets of RGB values to the printer 1 and printing color samples on the prescribed recording medium and by measuring the color samples with a colorimeter to obtain the plurality of sets of L*a*b* values. Specifically, the color gamut data includes data indicative of a plurality of envelopes that encompass all the L*a*b* values (sample points) and that are defined at a plurality of hue angles, respectively. The hue angles are arranged at 5-degree intervals, for example, in the L*a*b* color space. One algorithm well known in the art for determining the envelope by finding a surface enveloping all sample points is called the "gift wrapping" algorithm.

The Lab→RGB conversion table stored in the Lab→RGB conversion table memory area 12b is a lookup table 11 storing a plurality of sets of RGB values in association with a plurality of sets of L*a*b* values that are varied at prescribed steps. One set of the RGB values corresponding to each set of L*a*b* values is found according to a method well known in the art based on the output RGB→L*a*b* data for the printer 1.

The highest-chroma output color memory area 12d stores, in association with each of the plurality of hues that are arranged at the 5-degree intervals, one set of L*a*b* values that has the highest chroma among all the sets of L*a*b* values that are located in the output gamut and that have the subject hue. The maximum/minimum value memory area 12e stores maximum and minimum values for the output gamut on the achromatic axis (L* axis).

The RAM 13 is a rewritable random access memory that has a work area provided with a group of registers used by the CPU 11 when executing the control programs, and a temporary area for temporarily storing data during control processes.

The RAM 13 is also provided with an input RGB→Lab memory area 13a, an input gamut memory area 13b, a highest-chroma input color memory area 13c, and an RGB→R'G'B' memory area 13d.

The input RGB→Lab memory area 13a is for storing the input RGB→Lab data described above. The input gamut memory area 13b is for storing a color gamut for each of a plurality of hues that is found based on the input RGB→Lab data stored in the RGB→Lab memory area 13a. The method of finding the input color gamut is the same as the method of finding the output gamut described earlier. Hence, an envelope encompassing the plurality of L*a*b* values is stored for each of the plurality of hues that are arranged at intervals of 5 degrees, for example. Similarly, the highest-chroma input color memory area 13c is for storing, in association with each of the plurality of hues that are arranged at the 5-degree intervals, for example, one set of L*a*b* values that has the highest chroma among all the sets of L*a*b* values that are located in the input gamut and that have the subject hue.

Figure 4:
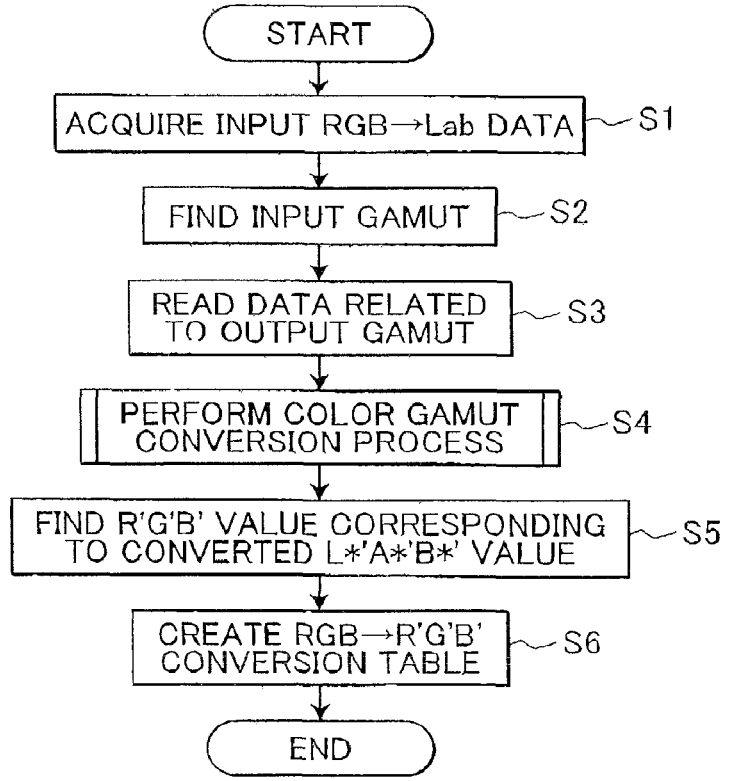
FIG. 4 is a flowchart illustrating steps in an image process.

The RGB→R'G'Br' memory area 13d is for storing an RGB→R'G'B' conversion table that is created in the image process of FIG. 4. This table stores a plurality of sets of R'G'B' values in association with the plurality of sets of RGB values. When the printer 1 converts an arbitrary set of RGB values into a set of R'G'B' values by referencing this table and performs printing operation based on this set of R'G'B' values, the resulting printed image will match the color in an image printed by the target printer A based on the original RGB value set.

Figure 3:
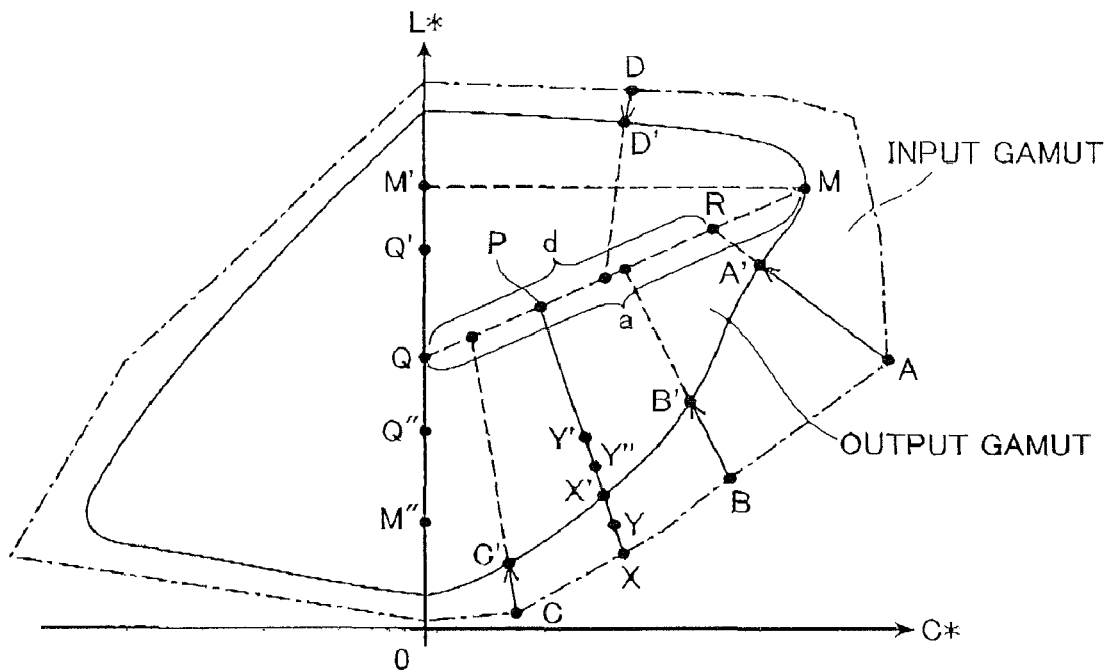
FIG. 3 is a graph illustrating a method of converting input color data according to the embodiment.

Next, a method of color gamut compression according to the embodiment will be described with reference to FIG. 3. FIG. 3 is a graph illustrating a method of converting input color data included in an input gamut to output color data included in an output gamut, both being in the L*a*b* color space. For simplicity, the graph in FIG. 3 depicts an L*a*b* plane at a prescribed hue h* in the color space, where the horizontal axis represents chroma c* and the vertical axis is an achromatic axis and represents lightness L*. The input gamut is depicted with a dotted line, and the output gamut with a solid line.

As shown in FIG. 3, a cusp point M indicates a set of L*a*b* values that has the highest chroma among a plurality of L*a*b* values that are located in the output gamut on the L*c* plane at the subject hue h*. A midpoint Q is determined as a midpoint between minimum and maximum values of lightness in the output gamut on the achromatic axis (L* axis). That is, the lightness of the midpoint Q satisfies the following equation: (lightness of the midpoint Q)=½ [(the minimum value of the lightness in the output gamut on the L* axis)+(the maximum value of the lightness in the output gamut on the L* axis)]. A line segment MQ is defined between the point M and the midpoint Q. A point R is set such that a distance d between the point Q and the point R that is equal to a prescribed length, and that the point R is located on the line segment MQ. A convergence point for an arbitrary L*a*b* value set (input color data) in the input gamut is set on the line segment QR.

More specifically, the convergence point for color data A that has the highest chroma in the input gamut at hue h* is set to the point H, while convergence points for other input color data are set to positions whose distances from point Q are found by multiplying the ratio of the chroma of the input color data and the highest chroma (chroma of the input color data A) by the distance d. More specifically, a distance "e" between the point Q and the convergence point for the input color data is calculated using the following equation, where $c_{max}$ is the highest chroma (chroma of the input color data A), and c is the chroma of the input color data.

$$e = d \times c / c_{max} \qquad \text{Equation 1}$$

In this way, the line segment QR is first defined in substantially the center of the output gamut. Convergence points are set on this line segment QR. The distance between the line segment QR and the surface of the input gamut on the side with higher lightness than the line segment QR is substantially equivalent to the distance between the line segment QR and the surface of the input gamut on the side having lower lightness than the line segment QR. This setting of the line segment QR prevents the distances between convergence points and the input color data from becoming too short. Accordingly, this technique achieves smooth color changes in images formed according to the converted color gamut as will be described later.

Further, since the convergence points set on the line segment QR differ according to the chroma of the input color data, the distance between the convergence points and the input color data can be maintained, preventing dramatic changes in chrome and lightness.

Next, an image process executed on the printer 1 will be described with reference to FIGS. 4 and 5. FIG. 4 is a flowchart illustrating steps in a main process, and FIG. 5 is a flowchart illustrating steps in a color gamut conversion process performed during the main process.

First, the main process will be described with reference to FIG. 4. In S1 of the main process, the CPU 11 of the printer 1 acquires input RGB→Lab data the printer A from the PC 2 or the external medium 20, and stores this data in the input RGB→Lab memory area 13a.

In S2 the CPU 11 finds an input gamut based on the input RGB→L*a*b* data and stores the input gamut in the input gamut memory area 13b. The CPU 11 further finds, for each of a plurality of hues arranged at the 5-degree interval, for example, one set of L*a*b* values that has the highest chroma among all the sets of L*a*b* values that are located in the input gamut and that have the subject hue. The CPU 11 stores the thus found highest-chroma-holding L*a*b* value set in the highest-chroma input color memory area 13c in association with the corresponding hue. In S3 the CPU 11 reads data related to the output gamut from the output gamut memory area 12c and in S4 performs a color gamut conversion process described later with reference to FIG. 5. This color gamut conversion process serves to convert the L*a*b*' values in the input RGB→Lab data to L*'a*'b*' values, so that the resulting L*'a*'b*' values successfully fall within the color gamut of the printer 1.

In S5 the CPU 11 finds R'G'B' values corresponding to the obtained L*'a*'b*' values by referencing the Lab→RGB conversion table stored in the Lab→RGB conversion table memory area 12b. Hence, in this process the CPU 11 finds R'G'B' values corresponding to the original RGB values. In S6 the CPU 11 creates an RGB→R'G'B' conversion table based on the original ROB values and the obtained R'G'B' values, and stores this conversion table in the RGB→R'G'B' memory area 13d.

The CPU 11 can reference this RGB→R'G'B' conversion table created above to convert RGB values inputted to the printer 1 to R'G'B' values. When the printer 1 prints an image using the R'G'B' values as input, the printer 1 can print images whose colors match the colors of images that are printed on the printer A based on the RGB values.

Next, the color gamut conversion process will be described with reference to FIG. 5. In the color gamut conversion process, the CPU 11 converts all L*a*b* values that are stored in S1 in the input RGB→Lab memory area 13a to L*'a*'b*' values.

In S11 at the beginning of this process, the CPU 11 determines whether the conversion process has been performed for all the sets of L*a*b* values stored in the input gamut memory area 13a. If the conversion process has been completed for all the sets of L*a*b* values (S11: YES), the CPU 11 ends the color gamut conversion process. However, while there remains some L*a*b* values set to be converted (S11: NO), in S12 the CPU 11 reads set of L*a*b* values as a set of input color data.

In S13 the CPU 11 converts the L*a*b* values in the input color data read in S12 to L*c*h* values. This conversion is performed according to a process well known in the art, where the value of L* is left unchanged, c* is calculated according to the following equation, $$c^* = \sqrt{(a^*)^2 + (b^*)^2} \qquad \text{Equation 2}$$

and h* is calculated according to the following equation. The calculated hue h* will be referred to as a "target hue", hereinafter.

$$h^* = \left(\arctan\frac{b^*}{a^*}\right) \times \frac{180}{\pi} \qquad \text{Equation 3}$$

In S14, the CPU 11 finds a cusp point M that has the highest chroma in the output gamut for the target hue h*. More specifically, if the highest-chroma output color memory 12d stores one set of L*a*b* values in correspondence with the target hue h*, the CPU 11 uses, as the cusp point M, the set of L*a*b* values that is stored in the highest-chroma output color memory 12d for the target hue h*. On the other hand, if the highest-chroma output color memory 12d stores no sets of L*a*b* values in correspondence with the target hue h*, the CPU 11 determines the cusp point M for the target hue h* by interpolating two sets of L*a*b* values that are stored in the highest-chroma output color memory 12d for two hues that are located on both sides of the target hue him A linear interpolation is used, for example, for this interpolation operation.

In S15 the CPU 11 reads the maximum and minimum values on the achromatic axis of the output gamut from the maximum/minimum value memory area 12e and calculates intermediate color data Q between these maximum and minimum values. That is, a length between the intermediate color data and the maximum value is half of a length between the maximum value and the minimum value. In S16 the CPU 11 finds a highest chroma $c_{max}$ (for example, chroma of the point A in FIG. 3) in the input gamut at the target hue h*. More specifically, if the highest-chroma input color memory 13c stores one set of L*a*b* values in correspondence with the target hue h*, the CPU 11 uses, as the highest chroma $c_{max}$ for the target hue h*, the chroma of the set of L*a*b* values that is stored in the highest-chroma input color memory 13c for the target hue h*. On the other hand, if the highest-chroma input color memory 13c stores no sets of L*a*b* values in correspondence with the target hue h*, the CPU 11 determines the highest chroma $c_{max}$ for the target hue h* by interpolating two sets of L*a*b* values that are stored in the highest-chroma input color memory 13c for two hues that are located on both sides of the target hue h*. A linear interpolation is used, for example, for this interpolation calculation.

In S17 the CPU 11 sets a point R on a line segment connecting color data Q and cusp data M at a prescribed distance 4 from color data Q and in S18 sets a convergence point for the input color data according to equation 1, where c is the chroma of the input color data. In S19 the CPU 11 finds a distance $r_{in}$ between the convergence point set in S18 and the surface of the input gamut along the line connecting the input color data and the convergence point, and a distance $r_{out}$ between the convergence point and the surface of the output gamut. In S20 the CPU 11 determines whether $r_{in}$ is greater than $r_{out}$. If $r_{in}$ is not greater than $r_{out}$ (S20: NO), then conversion is not necessary since the input gamut is smaller than the output gamut along the line connecting the convergence point to the input color data. Therefore, the CPU 11 returns to S11 and repeats the process described above. However, if $r_{in}$ is greater than $r_{out}$ (S20: YES), in S21 the CPU 11 converts the L*a*b* values in the input color data to L*'a*'b*' values (output color data) according to one of three methods described below. In other words, the CPU 11 corrects a distance r between the input color data and the convergence point based on the distances $r_{in}$ and $r_{out}$, as will be described below. Subsequently, the CPU 11 returns to S11.

Next, methods for converting input color data L*a*b* to L'*a'*b'* in S21 by using the point of convergence will be described.

If the input color data is located on the periphery of the input gamut as indicated by any of the points A, B, C, and D in FIG. 3, the set of L*a*b* values in the input color data is converted into a set of L*'a*'b*' values (output color data) that is located on the periphery of the output gamut and that is located on a line that connects the input color data and the point of convergence for the input color data. So, the distance $r=r_{in}$ is corrected into the distance $r_{out}$.

If the input color data is located not on the periphery of the input gamut as indicated by the point Y in FIG. 3, the set of L*a*b* values in the input color data is converted into a set of L*'a*'b*' values (output color data) according to either one of first through third methods which will be described below with reference to FIGS. 3 and 6(a), and 6(b).

Figure 6A:
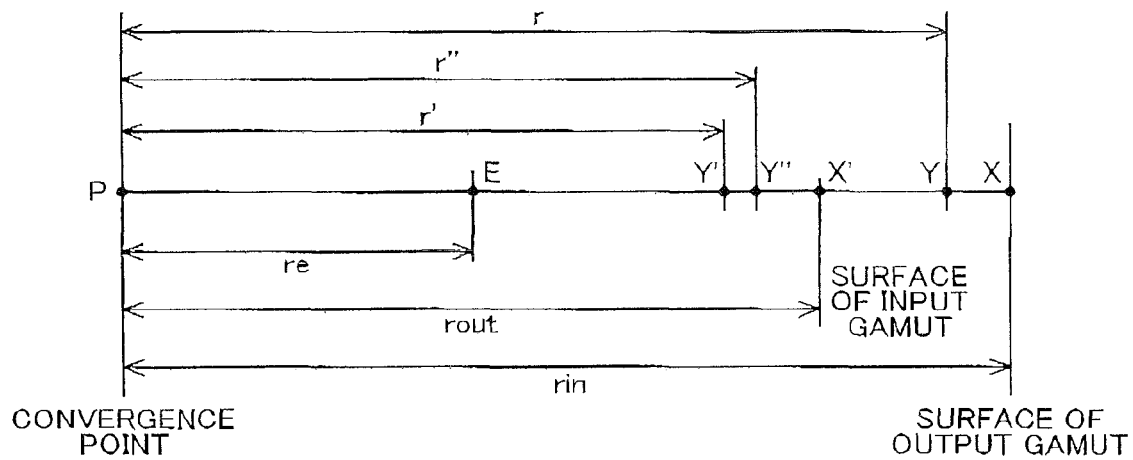
FIG. 6(a) illustrates methods of converting color data in a direction toward a point of conversion to compress a color gamut.

It is noted that as shown in FIGS. 3 and 6(a), a point P is first set in SIB as the point of convergence for the input color data Y. A point X is positioned on the periphery (surface) of the input gamut and on a line that passes through both of the points P and Y, while a point X' is positioned on the periphery (surface) of the output gamut and on the line that passes through both of the points P and Y.

<First Method>

In the first method, input color data Y is imply converted to the point X'.

<Second Method>

In the second method, the input color data Y is shifted in the direction toward the point of convergence P so that a distance of output color data Y' (L'*a'*b'* values) from the convergence point P is in proportion to the distance of the input color data Y from the convergence point P. Specifically, a distance r' from the convergence point P to the output color data Y' (L'*a'*b'* values) converted from input color data Y (L*a*b* values) is calculated according to the equation r'=r×$r_{out}$/$r_{in}$, where r is the distance from the convergence point P to the input color data Y, $r_{in}$ is the distance from the convergence point P to the input gamut surface X, and $r_{out}$ is the distance from the convergence point P to the output gamut surface X', as shown in FIG. 6(a).

<Third Method>

In a third method, a point E is set between the convergence point P and the point X' and on the line segment connecting the input color point Y with the convergence point P. In this method, if the input color data Y is located between point E and point X, the input color data Y (L*a*b* values) is converted into output color data Y" (L*'a*'b*' values) in a manner described below. If the input color data Y is located between the convergence point P and point E, the input color data is not converted. That is, the output color data Y" (L*'a*'b*' values) is set equal to the input color data Y (L*a*b* values).

Specifically, a distance r" from the convergence point P to output color data Y" is calculated according to the following equation, where $r_c$ is the distance from the convergence point P to point E, r is the distance from the convergence point P to the input color data Y, $r_{in}$ is the distance from the convergence point P to the point X on the surface of the input gamut, $r_{out}$ is the distance from the convergence point P to the point X' on the surface of the output gamut, and γ is a constant.

$$r'' = \left(\frac{r - re}{rin - re}\right)^{\gamma} \times (rout - re) + re \qquad \text{Equation 4}$$

Here, r" is set to r when r">r.

Figure 6B:
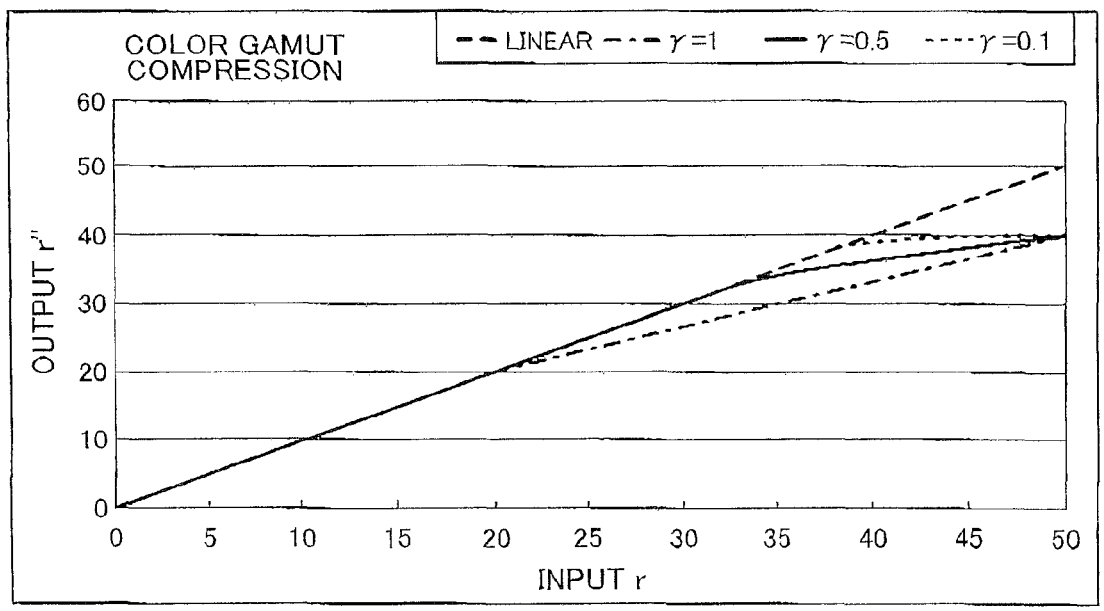
FIG. 6(b) shows a relationship between a distance from a convergence point to input color data and a distance from the convergence point to a converted output color data.

The graph in FIG. 6(b) shows the relationship between the distance r from the convergence point P to the input color data Y and the distance r" from the convergence point P to the converted output color data Y" when performing conversion according to the above third method. In the graph of FIG. 6(b), the horizontal axis represents the distance r and the vertical axis the distance r". Further, a broken line with alternating dashes and single-dots indicates the case of γ=1.0, the solid line indicates the case of γ=0.5, the dot line the case of γ=0.1, and the dashed line indicates a linear line in which no changes were made, where $r_{out}$=40, $r_{in}$=50, and re=20.

As described above, the embodiment sets the point R at a prescribed position on the line segment connecting the highest-chroma color M in the output gamut to the central point Q on the achromatic axis of the output gamut, and sets convergence points on the line segment QR connecting the points Q and R. In this way, the embodiment sets the distance between the segment QR and the surface of the input gamut on the side with higher lightness than the segment QR substantially equivalent to the distance between the segment QR and the surface of the input gamut on the side having lower lightness than the segment QR, thereby preventing the distance between the convergence points and the input color data from being too short. Accordingly, the invention can ensure smooth changes in the colors of images formed based on the converted color gamut.

Further, since the convergence points set on the line segment QR differ according to the chroma of the input color data, the embodiment maintains a distance between the convergence point and the input color data and prevents large changes in chroma and lightness.

While the invention has been described in detail with reference to the above embodiment thereof, it would be apparent to those skilled in the art that various changes and modifications may be made therein without departing from the spirit of the invention.

For example, while the embodiment describes a process performed on the printer 1, the process may be performed on a personal computer or a liquid crystal display or other display device.

Further, while the input gamut for the printer A is found on the printer 1 in the embodiment described above, the input gamut may be found on an external device and data specifying the input gamut may be inputted into the printer 1 and used for converting color data.

In the embodiment described above, as shown in equation 1, the convergence point is set to a point on the line segment QR separated from the point Q by a distance equivalent to the product of the ratio of the chroma of the input color data to the highest chroma of the point A that has the highest chroma $c_{max}$, in the input gamut for the same hue and the distance d between the point Q and the point R. However, the convergence point may be set to a point on the line segment QR separated from the point Q by a distance equivalent to a product of the distance d and a ratio of chroma of the input color data to a chroma of a point that has the highest chrome within the entire input gamut for all hues and the distance d. That is, the highest-chroma input color memory 13c is modified to additionally store chroma of one set of L*a*b* values that has the highest chroma among all the sets of L*a*b* values that are stored in the highest-chroma input color memory 13C. The thus additionally-stored chroma is the highest chroma within the input gamut for all of the hues, and is used as the value $c_{max}$ in the equation 1.

A plurality of candidates for convergence points may be preset on the line segment between the point Q and the point R and suitable convergence points may be selected from among these candidates based on the chroma of the input color data.

Further, according to the embodiment described above, while the point Q is defined as color data of an intermediate value between the maximum and minimum values on the achromatic axis of the output gamut, the point Q may be defined as color data positioned at the intermediate value (L*=50) between a prescribed maximum value (L*=100) and a prescribed minimum value (L*=0) on the achromatic axis, wherein the lightness L* is defined between the minimum value (0) and the maximum value (100).

Further, while the RGB→R'G'B' conversion table is stored in the RGB→R'G'B' memory area 13d in the embodiment described above, the printer 1 may be provided with flash memory capable of preserving data even when the power is shut off, and the RGB→R'G'B' conversion table may be stored in this flash memory.

In the embodiment, one end of the line segment, on which the convergence point is located, is the midpoint Q between minimum and maximum values of lightness in the output gamut on the achromatic axis. However, as shown in FIG. 3, the one end of the line segment may be a point Q' instead of the midpoint Q. The midpoint Q' may be any point located between a point M' and the midpoint Q. Here, the point M' is located on the achromatic axis (L* axis), and the lightness of the point M' is equal to the lightness of the point M where the output gamut has the highest chroma at the hue h*. The point Q' may be set as any one of the points located on a line segment M'Q. So, the point Q' is on the achromatic axis and is closer to the midpoint Q than the point M'.

Additionally, the one end of the line segment, on which the convergence point is located, may be a point Q" as shown in FIG. 3. The point Q" may be any point located between the midpoint Q and a point M". The point M" is located on the achromatic axis (L* axis) and is on the opposite side of the point M' relative to the midpoint Q, with the distance between the point M" and the midpoint Q being equal to the distance between the point M' and the midpoint Q. So, the point Q" is on the achromatic axis and is closer to the midpoint Q than the point M'.

The method of converting color data in the direction toward the point of conversion to compress the color gamut is not limited to the first to third methods explained as shown in FIG. 6(a).

What is claimed is:

1. An image processor converting color data comprising:
    a first data acquiring unit that acquires first color data that is included in a first color gamut at a specific hue;
    a second data acquiring unit that acquires second color data having a highest chroma of a second color gamut at the specific hue, the second color gamut having a middle point on an achromatic axis between a highest lightness of the second color gamut on the achromatic axis and a lowest lightness of the second color gamut on the achromatic axis;
    a third data acquiring unit that acquires third color data that is located on the achromatic axis and that is closer to the middle point than a point on the achromatic axis having the same lightness of the second color data;
    a convergence point setting unit that sets a convergence point for the first color data on a first line segment defined between the second color data and the third color data;
    a converting unit that converts the first color data into fourth color data that is included in the second color gamut by moving the first color data in a direction toward the convergence point;
    a highest chroma acquiring unit that acquires a highest chroma of the first color gamut;
    a fifth data determining unit that determines fifth color data on the first line segment to create a first distance defined between the third color data and the fifth color data such that the first distance is shorter than a prescribed distance between the second color data and the third color data;
    a sixth data determining unit that determines sixth color data on a line segment between the convergence point and seventh color data, the seventh color data being an intersection point between a periphery of the second color gamut and a line segment connecting the first color data and the convergence point; and
    a second distance determining unit that determines a second distance by multiplying the first distance by a ratio of a chroma of the first color data to the highest chroma of the first color gamut,
    wherein when the first color data is located between the convergence point and the sixth color data, the converting unit does not convert the first color data, and when the first color data is not located between the convergence point and the sixth color data, the converting unit converts the first color data into the fourth color data such that the fourth color data is located on a line segment between the sixth color data and the seventh color data,
    wherein the convergence point setting unit sets the convergence point based on a chroma of the first color data; and
    wherein the convergence point setting unit sets the convergence point for all of the first color data located outside of the second color gamut at the specific hue to a point that is located on a second line segment between the third color data and the fifth color data and that is apart from the third color data by the second distance.

2. The image processor as claimed in claim 1 wherein the lightness of the third color data is equal to a lightness of the middle point.

3. The image processor as claimed in claim 2 wherein the lightness is expressed between a predetermined maximum lightness value and a predetermined minimum lightness value,
    wherein the lightness of the third color data is an intermediate value of the predetermined maximum lightness value and the predetermined minimum lightness value.

4. The image processor as claimed in claim 2, wherein the first color gamut has a highest chroma at each of a plurality of hues, the highest chroma acquiring unit acquires the highest chroma of the first color gamut from the highest chroma of at least one of the hues corresponding to the hue of the first color data.

5. The image processor as claimed in claim 2, wherein the first color gamut has a plurality of highest chromas at a plurality of hues, the highest chroma acquiring unit acquires the highest chroma of the first color gamut from a highest value among the plurality of highest chromas.

6. The image processor as claimed in claim 2, wherein the second color gamut has a highest chroma at each of a plurality of hues, the second data acquiring unit acquires the second color data from the highest chroma of at least one of the hues corresponding to the hue of the first color data.

7. An image processing method converting color data comprising:
    acquiring first color data that is included in a first color gamut at a specific hue angle;
    acquiring second color data having a highest chroma of a second color gamut at the specific hue angle, the second color gamut having a middle point on an achromatic axis between a highest lightness of the second color gamut on the achromatic axis and a lowest lightness of the second color gamut on the achromatic axis;
    acquiring third color data that is located on the achromatic axis and that is closer to the middle point than a point on the achromatic axis having the same lightness of the second color data;
    setting a convergence point for the first color data on a first line segment defined between the second color data and the third color data;
    converting the first color data into fourth color data that is included in the second color gamut by moving the first color data in a direction toward the convergence point;
    acquiring a highest chroma of the first color gamut;
    determining fifth color data on the first line segment to create a first distance defined between the third color data and the fifth color data such that the first distance is shorter than a prescribed distance between the second color data and the third color data;
    determining sixth color data on a line segment between the convergence point and seventh color data, the seventh color data being an intersection point between a periphery of the second color gamut and a line segment connecting the first color data and the convergence point; and
    determining a second distance by multiplying the first distance by a ratio of a chroma of the first color data to the highest chroma of the first color gamut,
    wherein when the first color data is located between the convergence point and the sixth color data, the converting does not convert the first color data, and when the first color data is not located between the convergence point and the sixth color data, the converting converts the first color data into the fourth color data such that the fourth color data is located on a line segment between the sixth color data and the seventh color data, wherein the convergence point is based on a chroma of the first color data, and the convergence point is set for all of the first color data located outside of the second color gamut at the specific hue angle to a point that is located on a second line segment between the third color data and the fifth color data and that is apart from the third color data by the second distance.

8. A computer-readable storage device storing a set of program instructions executable on an image processor, the program instructions comprising:

acquiring first color data that is included in a first color gamut at a specific hue;

acquiring second color data having a highest chroma of a second color gamut at the specific hue, the second color gamut having a middle point on an achromatic axis between a highest lightness of the second color gamut on the achromatic axis and a lowest lightness of the second color gamut on the achromatic axis;

acquiring third color data that is located on the achromatic axis and that is closer to the middle point than a point on the achromatic axis having the same lightness of the second color data;

setting a convergence point for the first color data on a first line segment defined between the second color data and the third color data; and converting the first color data into fourth color data that is included in the second color gamut by moving the first color data in a direction toward the convergence point;

acquiring a highest chroma of the first color gamut;

determining fifth color data on the first line segment to create a first distance defined between the third color data and the fifth color data such that the first distance is shorter than a prescribed distance between the second color data and the third color data;

determining sixth color data on a line segment between the convergence point and seventh color data, the seventh color data being an intersection point between a periphery of the second color gamut and a line segment connecting the first color data and the convergence point; and determining a second distance by multiplying the first distance by a ratio of a chroma of the first color data to the highest chroma of the first color gamut, wherein when the first color data is located between the convergence point and the sixth color data, the converting does not convert the first color data, and when the first color data is not located between the convergence point and the sixth color data, the converting converts the first color data into the fourth color data such that the fourth color data is located on a line segment between the sixth color data and the seventh color data, wherein the convergence point is based on a chroma of the first color data, and the convergence point is set for all of the first color data located outside of the second color gamut at the specific hue to a point that is located on a second line segment between the third color data and the fifth color data and that is apart from the third color data by the second distance.

* * * * *